United States Patent
Choen et al.

(10) Patent No.: US 10,353,962 B2
(45) Date of Patent: Jul. 16, 2019

(54) METHOD AND SYSTEM FOR BITRATE MANAGEMENT

(71) Applicant: Flash Networks, Ltd, Herzlia (IL)

(72) Inventors: Yosi Choen, Netanya (IL); Stefan Grefen, Nierstein (DE); Adi Weiser, Givatayim (IL); Yoav Weiss, Saint Donat sur l'Herbasse (FR)

(73) Assignee: Flash Networks, Ltd, Herzlia (IL)

( * ) Notice: Subject to any disclaimer, the term of this patent is extended or adjusted under 35 U.S.C. 154(b) by 517 days.

(21) Appl. No.: 15/141,971

(22) Filed: Apr. 29, 2016

(65) Prior Publication Data

US 2016/0323201 A1 Nov. 3, 2016

Related U.S. Application Data

(60) Provisional application No. 62/155,429, filed on Apr. 30, 2015.

(51) Int. Cl.
*G06F 16/95* (2019.01)
*H04L 29/06* (2006.01)
*H04L 29/08* (2006.01)
*H04L 12/823* (2013.01)
*H04L 12/851* (2013.01)

(52) U.S. Cl.
CPC .......... *G06F 16/95* (2019.01); *H04L 47/2483* (2013.01); *H04L 47/32* (2013.01); *H04L 65/105* (2013.01); *H04L 65/4084* (2013.01); *H04L 65/605* (2013.01); *H04L 65/80* (2013.01); *H04L 67/141* (2013.01); *H04L 47/323* (2013.01)

(58) Field of Classification Search
CPC ............ H04L 47/801; H04L 65/105; H04L 65/4084; H04L 65/604; H04L 65/605; H04L 65/80; H04L 67/141; G06F 17/30861
USPC ......................................... 709/219
See application file for complete search history.

(56) References Cited

U.S. PATENT DOCUMENTS

| | | | |
|---|---|---|---|
| 2008/0021874 A1* | 1/2008 | Dahl | G06F 17/30899 |
| 2011/0082946 A1* | 4/2011 | Gopalakrishnan | H04L 65/4084 709/231 |
| 2013/0067109 A1* | 3/2013 | Dong | H04L 65/4069 709/231 |
| 2014/0226571 A1* | 8/2014 | Das | H04L 41/0896 370/329 |
| 2014/0351450 A1* | 11/2014 | Lamouchi | H04L 47/29 709/230 |
| 2015/0052236 A1* | 2/2015 | Friedrich | H04L 43/08 709/224 |
| 2015/0156243 A1* | 6/2015 | Skog | H04L 65/605 709/219 |

* cited by examiner

*Primary Examiner* — James E Springer
(74) *Attorney, Agent, or Firm* — Smith Tempel Blaha, LLC; Gregory Scott Smith

(57) ABSTRACT

A technique that leads a surfer-equipment (SE) to switch to a lower bitrate is disclosed. The technique is implemented at an intermediate node between the SE and a domain. Leading the SE to switch to a lower bitrate is implemented by throttling one or more protocols each carried by one or more connections that carry packets of a multi-level-adaptive-bitrate (MLABR) media.

18 Claims, 6 Drawing Sheets

METHOD AND SYSTEM FOR BITRATE MANAGEMENT

CROSS-REFERENCE TO RELATED APPLICATIONS

This is a utility patent application being filed in the United States as a non-provisional application for patent under Title 35 U.S.C. § 100 et seq. and 37 C.F.R. § 1.53(b) and, claiming the benefit of the prior filing date under Title 35, U.S.C. § 119(e) of the United States provisional application for patent that was filed on Apr. 30, 2015 and assigned Ser. No. 62/155,429, which application is incorporated herein by reference in its entirety.

FIELD OF THE DISCLOSURE

The present disclosure generally relates to the field of data communication over a packet switch network such as Internet Protocol (IP) network. More particularly the disclosure relates to streaming of encrypted compressed media via a proxy server.

DESCRIPTION OF BACKGROUND ART

In order to meet a plurality of clients need certain source content can be encoded at multiple bit rates. In addition, each of the different bit rate streams can be divided into two or more corresponding segments. The two or more streams are associated with different video qualities. The video quality could be expressed in frame rate, resolution or other parameters.

Usually the plurality of compressed streams of the same media is used in order to correspond to the user's bandwidth and the capabilities of the user's device. Corresponding segments carries the same media content but are compressed in different bitrate. Thus, a client device can switch from one stream to another at a beginning of a segment while keeping the continuity of the rendered content. The only different is the quality of the encoding/decoding. Along the current disclosure and the claims the term "media" is used as representative term for audio and video or audio only or video only.

The streaming client is made aware of the available streams at differing bit rates, and segments of the streams by a manifest file. During rendering a Multi-layered-adaptive BR (MLABR) media, a player may switch from one stream to another based on available bandwidth, available media buffered inside the player and other factors. A reader who wishes to learn more about MLABR technology is invited to read video streaming protocol such as but not limited to HTTP Live Streaming (HLS) protocol or DASH (Dynamic Adaptive Streaming over HTTP), for example. HLS is an HTTP based media streaming communication protocol. The content of DASH and HLS protocol is incorporated herein by reference. Along the disclosure and the claims the terms user device, client, or player can be used interchangeably.

At the beginning of some streaming sessions, a description file can be sent by the relevant server toward the client. For HLS stream, the description file can be M3U or M3U8, for example. For DASH, the manifest file is MPD. Along the disclosure and the claims the terms description file or manifest file can be used interchangeably. By parsing the obtained description file the player is introduced to the DASH available streams having different parameters, such as bitrate for example, and one or more segments lists. The player may choose to use a segment which belongs to a specific stream/bitrate according to the available media buffering and other parameters. Along the present disclosure the term session can be used as representative term for a ML (multi-level) streaming session.

There are several methods for associating two or more connections that carry data of the same session. Packets related to the same session might have the same source and destination IP address. Thus, parsing the source and destination IP address can be used for sorting the packets to a session. Alternatively a session ID, which is sent with the data can be used for sorting the packets to a session.

The manifest file or files describe the segments and their locations and optionally the different bitrates, codecs or any other assisting information. The manifest file or files can be sent prior to the compressed media or during the media streaming operation.

Streamed compressed media can be encrypted. The encryption can be in several levels. In some sessions the media itself is encrypted while the transport is not. In other sessions, the transport layer (HTTPS for example) is encrypted. The transport layer of streams that are carried over a TLS connection can be encrypted, for example. TLS stands for Transport Layer Security. The term "encrypted media" can be used as a representative term for both encryption options.

Further, media streaming usually consumes large amount of the bandwidth, which affect the available bandwidth for other clients that share the same resources. Consequently an operator of the transport network can appreciate the option to control the amount of bandwidth that is consumed during the streaming of the media. A cellular operator, for example, will appreciate the possibility to control the consumed bandwidth that is used by a single user in order to release bandwidth to other users.

However, controlling the consumed bandwidth of a current Streamed session by an intermediate node or server is complicated. The intermediate node is not aware of the encryption keys that are used for encrypting/decrypting the current session. Thus, an intermediate node cannot decrypt the compressed media and transcode it to a lower bit rate.

BRIEF SUMMARY

The needs and the deficiencies that are described above are not intended to limit the scope of the inventive concepts of the present disclosure in any manner. The needs are presented for illustration only. The disclosure is directed to a novel technique for implementing bite rate management or enforcing lower bitrate of encrypted media streaming by a proxy or network element.

An example embodiment of the present disclosure overcomes the need to decode the encrypted media in order to transcode it into lower bitrate by enforcing the player to switch to a lower bitrate stream. An example embodiment of a Multi-layer-adaptive-bitrate-intermediate server (MLABIS) may, first, identify media stream that is originated from an MLABR media domain. Next, the MLABIS may decide that media stream needs to be throttle. Then, an embodiment of the MLABIS may control the channel bandwidth to a lower bitrate in order to encourage the player to switch from a stream that requires high bitrate to a lower bitrate stream in order to reduce the bandwidth (BW) consumption.

One example embodiment of an MLABIS may handle a list of IP addresses of domains that may deliver MLABR media streaming. Such a list can be stored in a domains database (DDB). The domains can comprise two types of domains. Domains such as Google-video, YouTube, etc., which are few non limiting examples of domains that use encrypted delivery of compressed media (the transport layer and the application layer are encrypted). The other type of domains delivers encrypted media while the transport layer is not encrypted. Netflix is an example of such a domain. Streams of a session that is established with one of those two types of domains can be marked as suspected encrypted compressed media.

Another example of an MLABIS may wait to obtain a Domain-Name System (DNS) request from a client's equipment. The MLABIS may check if the domain name is in the list of servers that may deliver MLABR media. In case that the domain name is in the list then the IP address, which is related to the DNS request, can be added to that list, if it is not there already. Next such embodiment of the MLABIS can wait for establishing one or more connections between the requesting client and the relevant IP address. If such one or more connections are established during a certain interval of time, then the one or more connections can be marked as carrying data of an encrypted compressed media session.

Some example embodiments of an MLABIS may analyze transport message fields of TLS, during the TLS establishment of the connection. Messages such as but not limited to client hello, server hello, or certificate contains information about the server or domain to which the connection is created. Connections that are carried over HTTPS HTTP 2.0 SPDY or QUIC protocols can be analyzed by using the Server Name Indication (SNI) field or similar server/domain identification fields. The ClientHello message is sent between the client and the server during establishment of a secure (encrypted) TLS connection. By analyzing the SNI (Server Name Indication) field of this message, an example embodiment of MLABIS may determine that the specific connection may be associated with MLABR media delivery domain and the session can be marked as a suspected session that may carry encrypted compressed media, which may require further analysis.

Next, packets of session that are marked, as suspected encrypted MLABR media, are transferred for further handling. While packets that are not marked as suspected carrying encrypted compressed media are transferred toward their destination without further processing.

Packets of sessions that are marked as suspected encrypted compressed media are transferred to an encrypted-compressed-media identifier (ECMI). An example embodiment of ECMI may start throttling the connection, leading the client to switch to a lower bitrate stream. In parallel to the throttling the bite rate, over the connection between the client and the MLABIS, the bite rate can be measured by an example embodiment of the MLABIS. Throttling can be implemented by postponing acknowledge packets sent from a client in response to obtain packets that carry encrypted compressed media from a server. In other embodiments the throttling can be implemented by postponing packets that carry encrypted compressed media sent from the relevant server.

The throttling can be increased in a pattern until the transmitted bitrate is reduced, in a step, to a lower level bitrate. The step reduction of the transmitted bitrate can indicate that the client device switches to a lower bitrate stream. The request to a lower bitrate is issued by the client.

Some embodiments of MLABIS can be configured to detect a seek request from a client. After detecting a seek request an embodiment of MLABIS can be configured to eliminate or lower the throttling in order to accelerate the response to the seek request and updating the buffers of the player. Identifying a seek request can be done by analyzing the upload packets size, and/or packet frequency or other parameters. An increase in the number of transmitted packets can be used as indication to a seek response.

There are applications that are configured to open two or more connections with a media source in order to accelerate the download session or to use more than one protocol either as alternative protocols TLS or QUIC or use both protocols in parallel to stream the media. Therefore, some embodiments of MLABIS are configured to determine if a download session is carried over two or more protocols which may be carried each by one or more connections. In such a session, an embodiment of MLABIS can be configured to identify the two or more connections as associated to the same media session and decide whether to throttle the accumulative bandwidth of the two or more protocols and connections instead of throttling those protocols and connections separately.

In case that two or more protocols are detected as carrying the same media, an example of the disclosed system may decide to completely block or delay one protocol so the media will be carried only in one protocol. In some embodiments, the disclosed system may decide to throttle the aggregated traffic from all the connections of the two or more protocols.

The foregoing summary is not intended to summarize each potential embodiment or every aspect of the present invention, and other features and advantages of the present invention will become apparent upon reading the following detailed description of the embodiments with the accompanying drawings and appended claims.

Furthermore, although specific exemplary embodiments are described in detail to illustrate the inventive concepts to a person skilled in the art, such embodiments can be modified to various modifications and alternative forms. Accordingly, the figures and written description are not intended to limit the scope of the inventive concepts in any manner.

Other objects, features, and advantages of the present invention will become apparent upon reading the following detailed description of the embodiments with the accompanying drawings and appended claims.

BRIEF DESCRIPTION OF THE SEVERAL VIEWS OF THE DRAWING

Exemplary embodiments of the present disclosure will be understood and appreciated more fully from the following detailed description, taken in conjunction with the drawings in which.

DETAILED DESCRIPTION OF EMBODIMENTS OF THE INVENTION

Turning now to the figures in which like numerals represent like elements throughout the several views, in which exemplary embodiments of the present disclosure are described. For convenience, only some elements of the same group may be labeled with numerals. The purpose of the drawings is to describe exemplary embodiments and not for production. Therefore features shown in the figures are chosen for convenience and clarity of presentation only. Moreover, the language used in this disclosure has been principally selected for readability and instructional purposes, and may not have been selected to delineate or circumscribe the inventive subject matter, resort to the claims being necessary to determine such inventive subject matter.

Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Although some of the following description is written in terms that relate to software or firmware, embodiments may implement the features and functionality described herein in software, firmware, or hardware as desired, including any combination of software, firmware, and hardware. In the following description, the words "unit," "element," "module" and "logical module" may be used interchangeably. Anything designated as a unit or module may be a stand-alone unit or a specialized or integrated module. A unit or a module may be modular or have modular aspects allowing it to be easily removed and replaced with another similar unit or module. Each unit or module may be any one of, or any combination of, software, hardware, and/or firmware, ultimately resulting in one or more processors programmed to execute the functionality ascribed to the unit or module. Additionally, multiple modules of the same or different types may be implemented by a single processor. Software of a logical module may be embodied on a computer readable medium such as a read/write hard disc, CDROM, Flash memory, ROM, or other memory or storage device, etc. In order to execute a certain task a software program may be loaded to an appropriate processor as needed. In the present disclosure the terms task, method, process can be used interchangeably.

Figure 1:
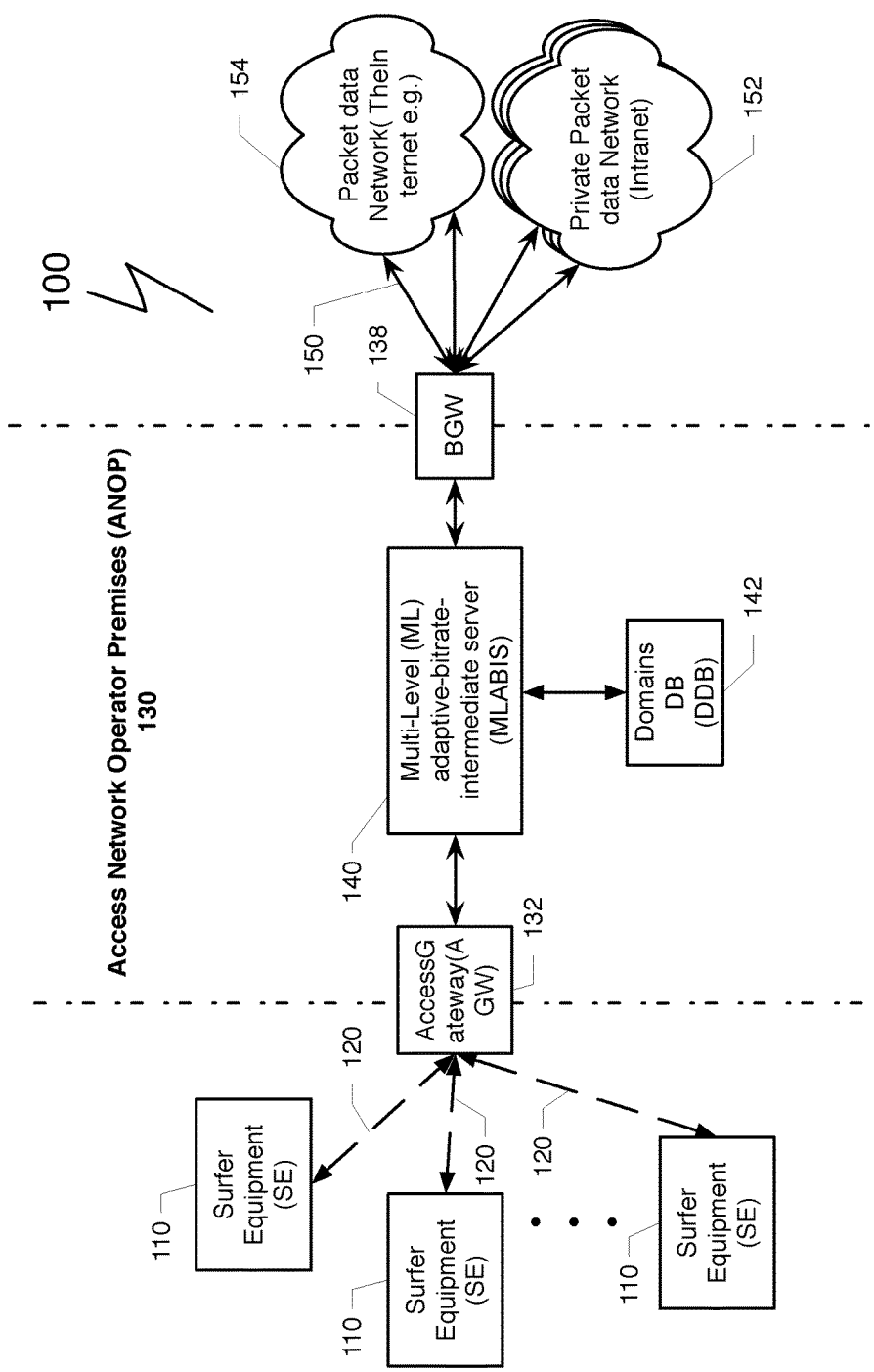
FIG. 1 illustrates a block diagram with relevant elements of an example Access Network Operator Premises (ANOP) in which an exemplary embodiment of the present disclosure can be implemented.

FIG. 1 depicts a block diagram with relevant elements of an exemplary communication system 100 in which an exemplary embodiment of the present disclosure can be implemented. Communication system 100 can be configured to handle media traffic over one or more communication links that comply with protocols such as but not limited to TCP/IP, for example. Network 100 can comprise an Access Network Operator Premises (ANOP) 130, a plurality of surfers' equipment (SE) 110, a plurality of intermediate nodes (not shown in the figures), the Internet (WWW) 154 and one or more private packet data network (Intranet) 152. Each one of the networks 152 and 154 can comprise a plurality of servers (not shown) containing media. The ANOP 130 can be the premises of a cellular operator, a telecom operator, an Internet provider, a satellite communication service provider, a Public Switched Telephone Network (PSTN) operator, etc.

An ANOP 130 can provide different services to a plurality of different surfers (or to the surfer equipment SE utilized by a surfer) 110. A few non-limiting examples of typical surfer equipment (SE) 110 can be: a laptop, a mobile phone, a PDA (personal digital assistance), a computer, smart phone, a tablet computer, etc. Each SE 110 employs an application such as YouTube Application, Netflix Application or any other player application. Some browsers have media-players applications that can be used for rendering some media types and protocols. Firefox (a trade name of Mozilla), Apple-Safari (a trade name of Apple Inc.), Google-Chrome (a trade name of Google Inc.), etc. are non-limiting examples of such browsers. An SE 110 can be connected to an access gateway (AGW) 132 through different communication links 120. The communication links 120 can be such as but not limited to, wireless links, wired links, ADSL links, cellular links, and so on.

A few non-limiting examples of services provided by an ANOP 130 can include: spam filtering, content filtering, bandwidth consumption distribution, transcoding, rating adaptation, etc. Among other elements an ANOP 130 may comprise an access gateway (AGW) 132, a multi-level-adaptive-bitrate-intermediate server (MLABIS) 140, a domain database (DDB) 142 and a border-gateway (BGW) 138. An example of DDB 142 may store information regarding the domains 154, 152 which can communicate with plurality of SE 110 via ANOP 130. Each entry in the DDB 142 can be associated with a domain having one or more servers. The entry can comprises information related to the ability of the domain to deliver encrypted multi-level-adaptive-bitrate (MLABR) streaming.

Among other tasks, an example of AGW 132 can be configured to identify a requesting SE 110 at its ingress to the ANOP 130, to process the data traffic to and from the plurality of SEs 110 via one or more intermediate nodes (not shown). The intermediate nodes depend on the type of the access network that is used. For LTE cellular network, the intermediate node can be EnodeB; for GSM network the intermediate node can be nodeB, etc. LTE stands for 3GPP Long Term Evolution, which is also referred as 4G cellular network.

In the direction from the SE 110 toward the internet 154 or one of the Intranet 152, the AGW 132 can be configured to transfer TCP/IP traffic toward the MLABIS 140. A few non-limiting examples of an AGW 132 can include: a GPRS-Gateway-Support Node (GGSN) in a GSM network, a PDSN in a CDMA network, etc. An exemplary AGW 132 can be required to identify the subscriber and accordingly can determine whether the subscriber is allowed to get the required access to the network and what services the subscriber is entitled to receive, for example. In addition, the AGW 132 may participate in a process of allocating one or more public IP addresses to a requesting SE 110 to be used in the current access session.

In some embodiments of the system 100 the AGW 132 and the BGW 138 can be configured to transfer HTTP/TCP traffic toward MLABIS 140 and to transfer the rest of the traffic toward their destination via BGW 138 or AGW 132, respectively. The border gateway (BGW) 138, at the other side of ANOP 130 can be a router, for example. The BGW 138 can route IP data packets to and from the plurality of networks 152 and 154 via the Internet world-wide web (WWW). The communication between the BGW 138 and the packet data networks 152&154 can be based on Internet protocol.

In addition to common operation of a proxy, for the plurality of SEs 110, an example embodiment of MLABIS 140 can be configured to manage the bandwidth consumption of one or more streams of MLABR compressed media by enforcing lower bitrate. Example embodiment of MLABIS 140 can be configured to identify connections that can carry MLABR compressed media, throttle the connection in order to encourage the player to switch from a stream that requires high bitrate to a lower bitrate stream for reducing the bandwidth (BW) consumption. More information on the operation of an example of MLABIS 140 is disclosed below in conjunction with FIGS. 2 to 5.

Figure 2:
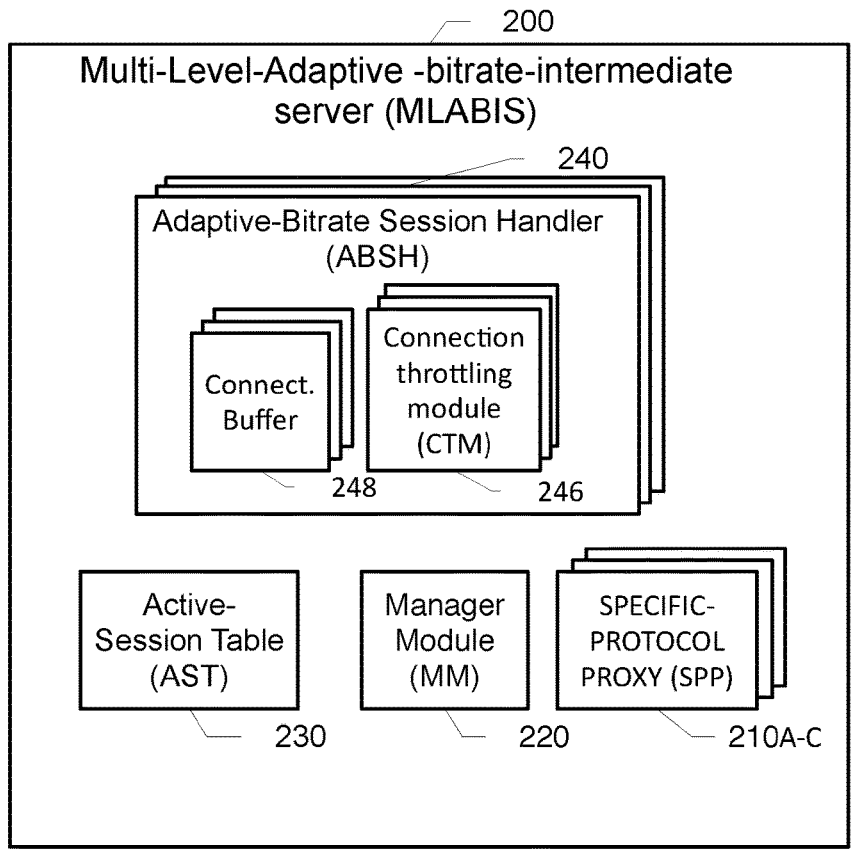
FIG. 2 illustrates a block diagram with relevant elements of an example of a multi-layer-adaptive-bitrate-intermediate server (MLABIS), according to the teaching of the present disclosure.

FIG. 2 depicts a block diagram with relevant elements of an example embodiment of an MLABIS 200. An example embodiment of MLABIS 200 may comprise one or more processors, computer readable medium such as a read/write hard disc, CDROM, Flash memory, ROM, or other memory or storage devices, etc. Software of a logical module may be embodied on one of the computer readable medium. In order to execute a certain task, a software program may be loaded to an appropriate processor as needed. An example of MLABIS 200 can comprises a manager module (MM) 220; an active session table (AST) 230 stored in a memory device; and one or more adaptive-bitrate-session handler (ABSH) module 240.

Some embodiments of MLABIS 200 may further comprise one or more Specific-Protocol-proxies (SPP) 210A-C. Each SPP 210A-C can be configured to handle different transport protocol. SPP 210A can be configured to handle HTTP, SPP 210B can be configured to handle TLS. Other SPP can be configured to handle other transport protocols such as but not limited to QUIC, SPDY or HTTP 2.0 (some of those proxies are not shown in the figures). In some embodiments, one or more SPP 210A-C can be transparent proxies. Along the below disclosure and the claims the term Proxy 210 can be a representative term for each one of the SPP 210A-C.

In order to respond to media sources that deliver the same media (video) over several protocols, interchangeably or at the same time., an example of proxy 200 can be adapted to check whether an identical session with the same media source (domain names or SNI) and the same client (destination address) already exists and carried by a different protocol, if such session already exists, then a decision can be made whether to throttle either protocols or only one, and accordingly one or more SPP 210A-C can be allocated.

In one direction, each SPP 210A-C can receive a plurality of request packets, which use the relevant transport protocol, from different surfers via their SE 110 (FIG. 1). Among other activity, each SPP 210A-C can process a received packet. Based on the header of the packet, the relevant SPP 210A-C can define a session to which the packet belongs. A session can be identified by the destination address and by the source address or other session detection methods, such as a session ID, for example. Then, the AST 230 can be searched looking for an entry that is associated with that session.

If an entry exists, then the entry can be parsed and the packet can be routed accordingly, toward a relevant ABSH 240 or directly toward its destination. If an entry does not exist, then the relevant SPP 210A-C can allocate an entry in the AST 230; and update the relevant fields of that entry. Fields such as but not limited to source address and port number, destination address and port number, domain name, session ID, etc. Then, the packet or a pointer to the packet can be transferred toward a queue of the allocated ABSH 240. In an alternate embodiment, if an entry, in AST 230, does not exist, then the relevant SPP 210A-C may transfer the packet to a queue of the MM 220.

In the other direction, an example of SPP 210A-C can receive responses, from one or more servers. The servers can be located in the one or more networks 152 or 154. Based on the source and the destination IP addresses or other session identification method, the AST 230 can be searched looking for an entry that is associated with that session, then the entry can be parsed and the packet can be routed accordingly, toward a relevant ABSH 240 or directly toward its destination. More information on the operation of an example of an SPP 210A_C is disclosed below in conjunction with FIGS. 4A and 4B.

An example of MM 220 can be configured to manage the entire operation of the MLABIS 200. During initiation, MM 200 can allocate the computing and the storage (memory volume) resources per each module of MLABIS 200. In some embodiments the MM 220 can be further configured to handle new sessions that are not recorded in the AST 230. In such embodiment, the MM 220 can be configured to fetch a packet from the MM 220 queue, identify packets of sessions that can be associated with encrypted-compressed-media. Those sessions can be marked as suspected session. Per each suspected session, the MM 200 can allocate an ABSH 240 and update the relevant entry of the AST 230. Accordingly, further packets of that session will be handled by the allocated ABSH 240. Per each new session, which is not suspected as associated with encrypted-compressed-media, the AST 230 can be updated for indicating that packets of that session can be transferred directly toward their destination.

Update of an entry in the AST 230 may comprise updating the relevant fields of that entry. Fields such as but not limited to source address and port number, destination address and port number, domain name, or session ID number and the next destination. The next destination can be the allocated ABSH 240 or the original destination of the packet. Accordingly the packet can be transferred toward the queue of the allocated ABSH 240 or directly toward its original destination.

In some embodiments of MLABIS 200, the MM 220 can be configured to identify a new session as suspected session, which may carry encrypted compressed media. Identifying a suspected session can be made by searching the DDB 142 (FIG. 1). In case that the relevant server/domain, appears in the DDB 142, then the session can be marked as a session that is associated with encrypted-compressed MLABR media. Domains that can deliver MLABR media may comprise domains such as Google-video, YouTube, etc. that use encrypted delivery of compressed media (the transport layer and the application layer are encrypted); or domain such as Netflix that delivers encrypted media while the transport layer is not encrypted.

In some embodiments of MLABIS 200, an example of MM 220 can be configured to identify a new session as a suspected encrypted compressed media session by throttling the connection; the throttling can be increased in a certain pattern. In response to the increased throttling, at a certain point of time the client of an MLABR media can be motivated to switch to a lower bitrate stream. An example of MLABIS 200 can be configured to identify the switching to the lower bitrate that occurs over the connection between the client and the MLABIS 200. Based on the switching to a lower bitrate a conclusion can be made that the relevant session is related to an encrypted compressed media and the relevant server or domain can be added to the list of domains in the DDB 142 that can deliver encrypted MLABR compressed media.

From time to time, an example of MM 220 can monitor the AST 230 looking for inactive sessions. Upon determining that a session is not active, the MM 220 may release the resources that were allocated to that session. Inactive session can be a session that the duration of time between the last received packet of that session is larger than a certain threshold. The released resources can comprise the relevant computing and storage resources that were allocated to the relevant ABSH 240 and the relevant entry in the AST 230 of that inactive session.

Per each new session that is associated with encrypted compressed media an example of MM 220 may further be configured to identify the one or more TCP/IP connections that carries the new session and accordingly may configure the allocated ABSH 240. Per each connection of that session an example of ABSH 240 may comprise a connection-throttling module (CTM) 246; and a connection buffer 248. The connection buffer 248 can be implemented by read/write hard disc, Flash memory, random-access memory (RAM), etc. Then, the entry in the AST 230 can be updated accordingly. In some embodiments of CTM 246, throttling can be implemented by postponing the acknowledge packets sent from a client in response to obtain packets from that server. In other embodiments of CTM 246 throttling can be implemented by postponing the obtain packets from that server targeted toward the relevant client. More information on the operation of an example of MM 220 is disclosed below in conjunction with FIG. 3.

In some embodiments of MLABIS 200, the download traffic can be throttled. In other embodiment the upload traffic can be throttled. In download throttling, request packets of a relevant session can be transferred by the relevant SPP 210A-C toward their destination server. Following response packets of that session will be transferred, by the relevant SPP 210A-C, toward the buffer 248 of the relevant ABSH 240 in order to be postponed (throttled).

Other embodiments of MLABIS 200 may throttle the upload traffic. In such embodiments request packets of a relevant session will be transferred by the relevant SPP 210A-C toward the buffer 248 of the relevant ABSH 240 in order to be postponed (throttled). In the other direction, response packets of that session will be transferred by the relevant SPP 210A-C toward their destination SEs 110 (FIG. 1). More information on the operation of an example of MM 220 is disclosed below in conjunction with FIG. 3.

In some embodiments of MLABIS 200, the MM 220 can be configured to identify that a new upload session, is carried over a plurality of connections that may comply with two or more transport protocols. Such an embodiment of MM 220 can be configured to instruct one or more SPP 210A-C to enforce the mobile device to close one or more of those connections.

An example connection-throttling module (CTM) 246 can be configured to fetch the next packet from the relevant connection buffer 248, wait for a period of TPP milliseconds. TPP stands for throttling-postponing period. In some embodiments of CTM 246 the TPP can be in the range between 0 to 3000 milliseconds, 1500 millisecond for example. At the end of the TPP, the CTM 246 can transfer the packet or the pointer to that packet toward the queue of the relevant SPP 210A-C in order to be transferred toward its destination. More information on the operation of an example of CTM 246 is disclosed below in conjunction with FIG. 5.

Figure 3:
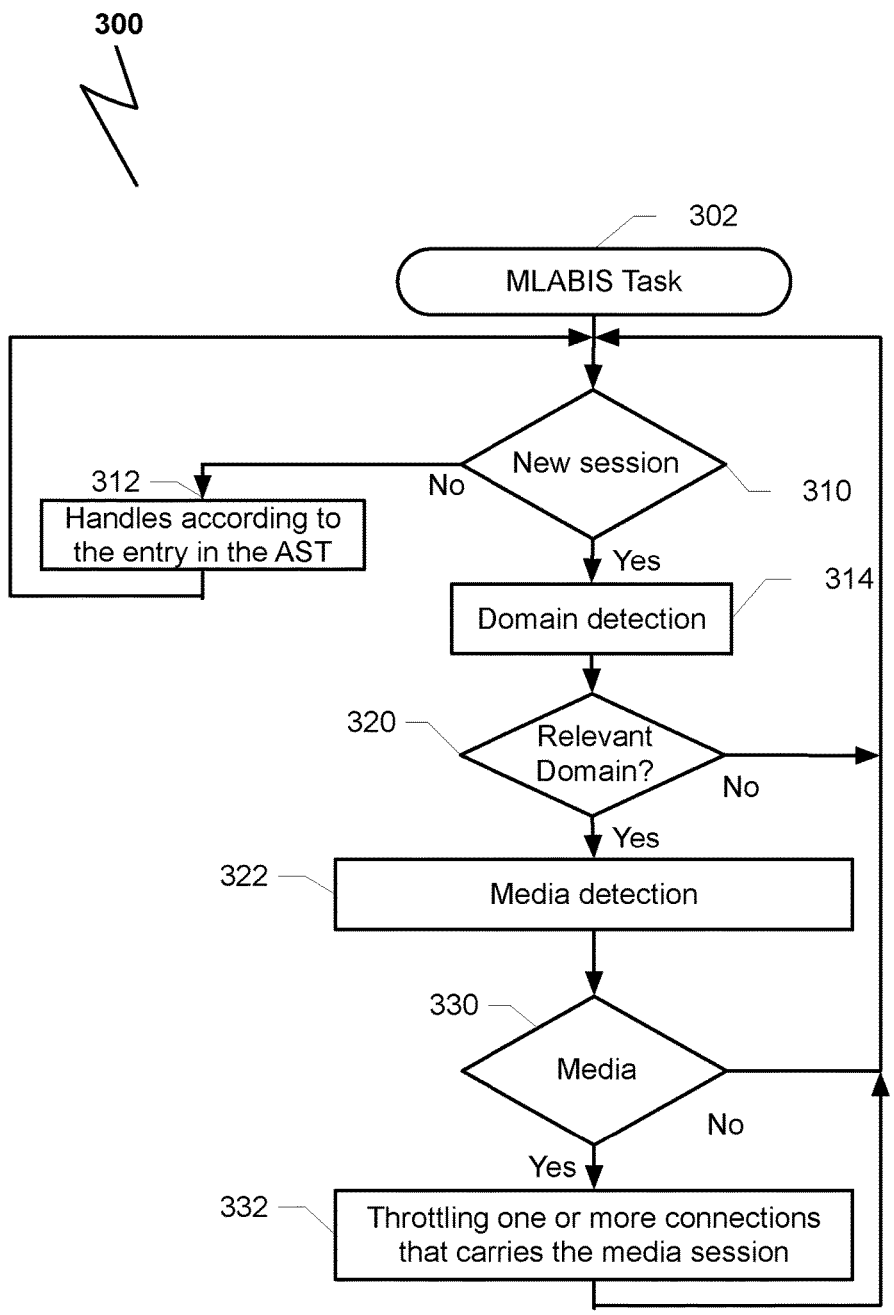
FIG. 3 illustrates a flowchart with relevant actions of a process that can be implemented by an example of an MLABIS.

FIG. 3 illustrates a flowchart with relevant actions of an example process 300 that can be used for handling a media session between a SE 110 (FIG. 1) and a server that is located in one of the networks 154 or 152. The process 300 can be implemented by an example of MLABIS 140 (FIG. 1). In general, packets that are transferred via MLABIS 140 are parsed. Next, based on their destination and source IP address and port or any other type of session ID, the AST 230 can be searched in order to determine 310 whether the packet belongs to a new session. If not, the packet can be handled 312 according to the relevant entry in the AST 230. Thus, the packet can be routed toward its destination or toward an ABSH 240 that was allocated per that session. Next, process 300 can return to block 310 for handling the next packet in the queue.

If 310 the session is a new one, then at block 314 the domain can be detected 314 as a relevant, a suspected domain, which is a domain that can send encrypted compressed media or not. In some embodiments, the decision can be made by searching the DDB 142 looking for an entry in the DDB 112 that is associated with that domain. If an entry exists, then the entry is parsed and a decision is made 320 whether the domain is marked as a suspected (relevant) domain or not. In some embodiments, if the domain is not mentioned in the DDB 142, then MLABIS 200 may start throttling 322 the connection, in order to determine 330 whether the data is compressed MLABR. In some embodiments throttling can be used for media detection.

In order to detect 322 media, the throttling can be increased in a pattern until the transmitted bitrate is reduced in a step, to a lower bitrate. The step reduction of the transmitted bitrate can indicate that the SE 110 requests to switch to a lower bitrate stream. Such behavior can indicate that the session is an MLABR session 330 and the relevant domain can be added to the DDB 142 (FIG. 1). Further, the session can be marked as a session that carries encrypted compressed media and the AST can be updated accordingly. Furthermore, process 300 can proceed to block 332 and can maintain throttling the one or more connections of that session. Furthermore the throttling could be done on a single socket of a single protocol, or on all sockets of a single protocol delivering the media or on all sockets of all the protocols delivering the media.

If 320 the entry in DDB 142 indicates that the domain is not a relevant one, then process 300 can update the AST that further traffic of that session can be transferred directly toward their destination and process 300 returns to block 310.

If 320 the domain appears in the DDB 142 as a relevant one, then at block 322, some example of MLABIS 140 may further determine whether the type of the payload of the session is an encrypted MLABIS compressed media or not. In order to detect 322 the content type, some embodiments of process 300 may check the amount of the transferred bytes (the media size) over the connection or session. In case that connection above a certain threshold of number of bytes for example 100 Kbytes, such a session can be marked as suspected media. Other embodiments of process 300 may check the duration of the session. In case that the duration is above a certain period of time, then the session can be marked as suspected media session. The period of time can be in the range of few seconds to few minutes, for example. Some embodiment may use a time threshold of 2 minutes for example.

In alternate embodiments, MLABIS 200 may start throttling the one or more connections of a new session. The throttling can be increased in a pattern until the transmitted bitrate is reduced, in a step, to a lower bitrate. The step reduction of the transmitted bitrate can indicate that the SE 110 switches to a lower bitrate stream indicating that the session is an MLABR session and the relevant entry in the AST 230 (FIG. 2) can be updated accordingly.

In case that the session is an encrypted MLABR session, then at block 332 an ABSH 240 module (FIG. 2) can be allocated for handling that session. Following packets of that session can be transferred toward the allocated ABSH 240 in order to be throttled. Further, process 300 can return to block 310 looking for a new session.

Figure 4A:
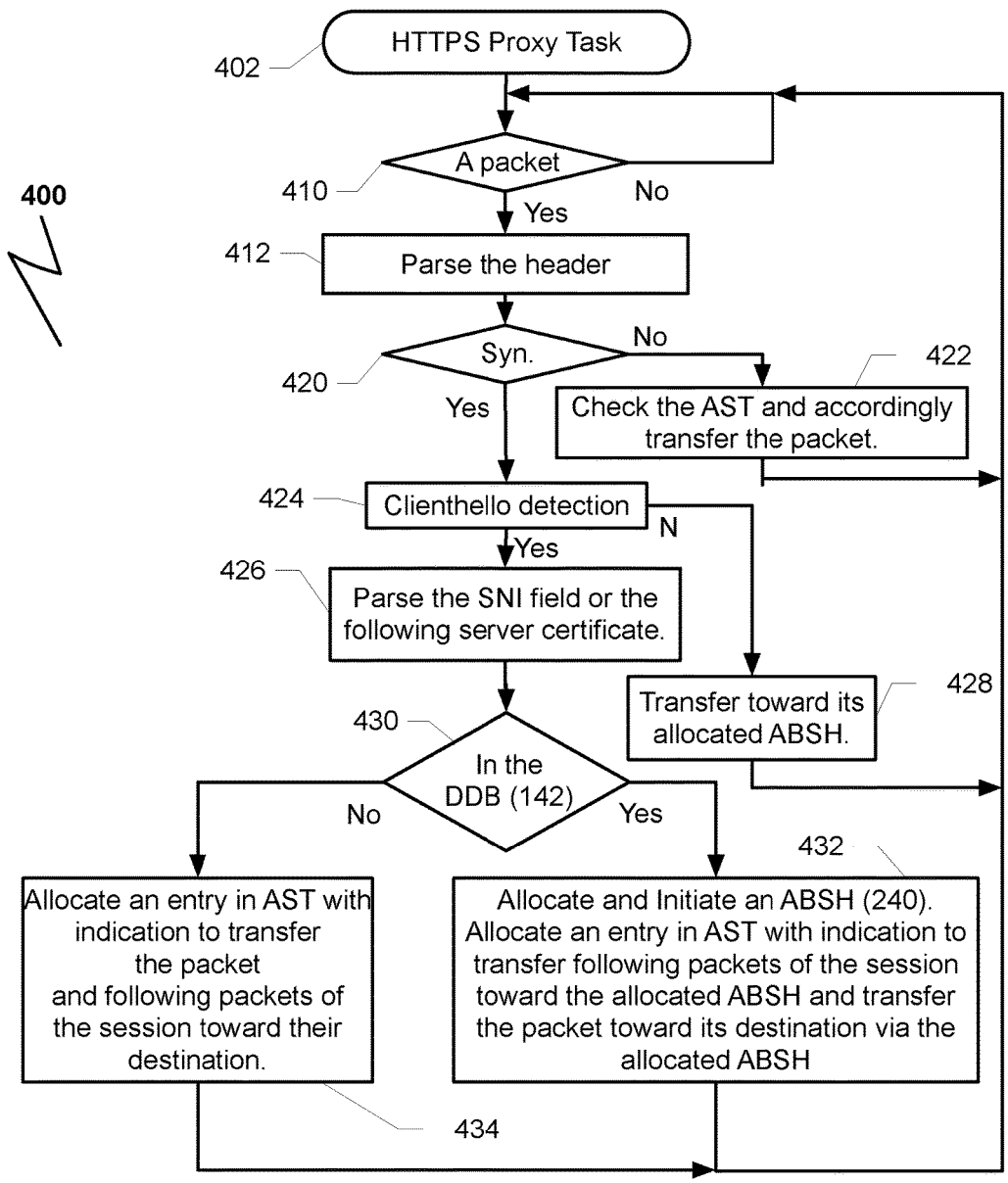
FIG. 4A illustrates a flowchart with relevant actions of a process that can be implemented by an example of an HTTPS proxy.

Referring now to FIG. 4A that illustrates a flowchart with relevant actions of a process 400 that can be implemented by an HTTPS proxy, as one of the example SPP, for example. The process 400 can commence upon initiating the HTTPS proxy. Upon initiation 402, process 400 may fetch 410 the next packet in its queue. The header of the packet can be parsed 412 in order to determine whether the packet is a SYN packet, which indicates starting of a new session. If 420 the packet is not a SYN, then the AST 230 can be searched 422 for an entry that is associated with the relevant session (source and destination IP addresses and ports, or other identification). Based on the routing information, which is written in that entry, the packet can be transferred 422 toward the relevant ABSH 240 (FIG. 2) or directly toward its destination.

If 420 the packet is a SYN packet, then the packet can be parsed in order to determine 424 whether the packet is a Clienthello message or similar message that used in other protocols. Protocols such as but not limited to TLS, QUIC HTTP 2.0; SPDY; etc. If 424 the packet is not a Clienthello message, then the packet can be routed 428 toward its allocated ABSH 240 and process 400 can return to block 410 for handling the next packet in the queue. If 424 the packet is a Clienthello message, then the SNI field, or a similar field for other protocols, and/or the following server certificate can be parsed in order to determine 426 the server name. Based on the SNI field or the server certificate, the DDB 142 (FIG. 1) can be searched looking 430 for a record that is associated with the server name.

If 430 a record exists, indicating that the domain (the server) can be referred as a suspected domain, which can deliver encrypted compressed media. Then, at block 432 a new ABSH 240 (FIG. 2) can be allocated in order to handle the traffic of the new session. In addition an entry in the AST 230 can be allocated 432 for that session pointing on the allocated AB SH 240 as the target for the next packets of that session and the current received packet can be transferred toward its destination via the allocated ABSH 240.

If 430 a record does not exist, indicating that the domain (the server) is not a suspected domain. Then, at block 434 a new entry in the AST 230 can be allocated for that session. The new entry can be configured to inform the HTTPS proxy to transfer the next packets of that session and the current received packet directly toward its destination and process 400 can return to block 410 for handling the next packet in the queue.

Figure 4B:
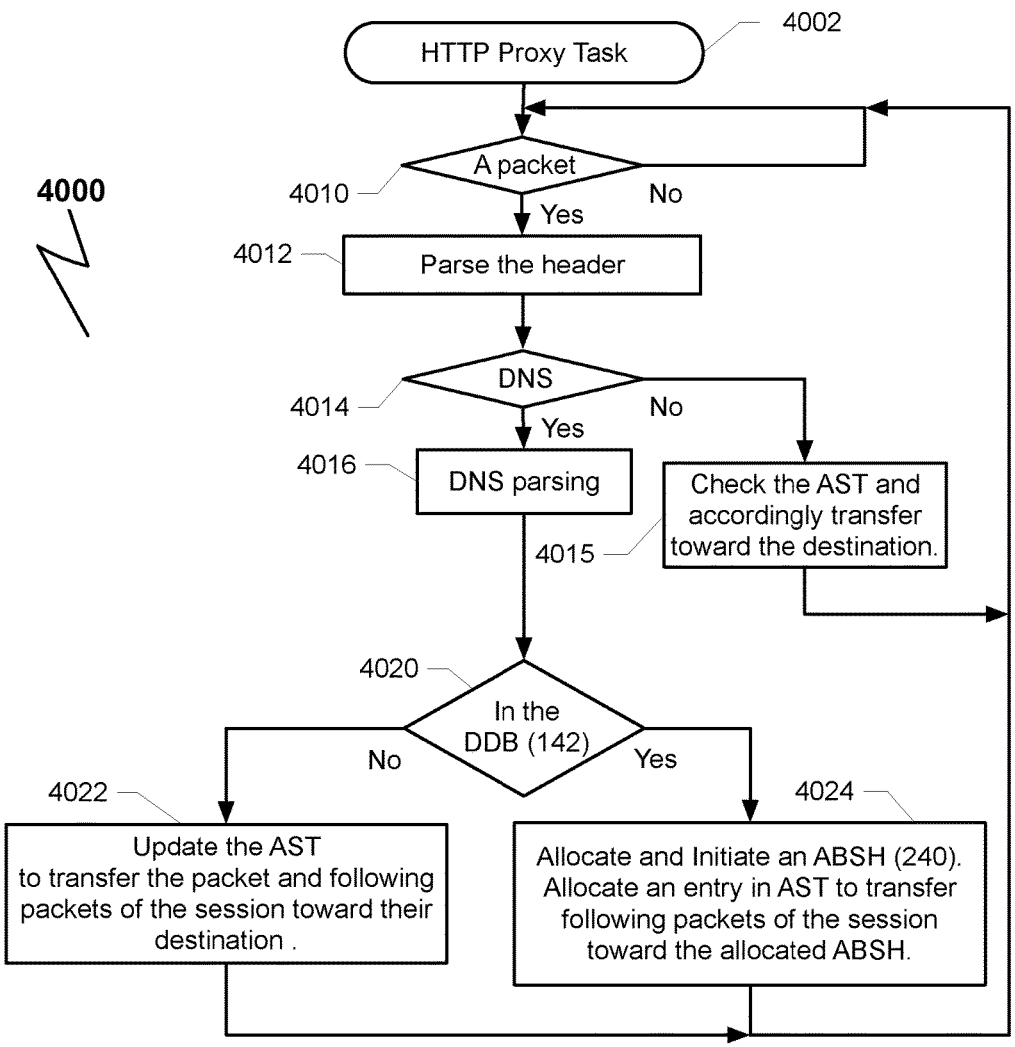
FIG. 4B illustrates a flowchart with relevant actions of a process that can be implemented by an example of an HTTP proxy.

Referring now to FIG. 4B that illustrates a flowchart with relevant actions of a process 4000 that can be implemented by an HTTP proxy, for example. The process 4000 can commence 4002 upon initiating the proxy (not shown in FIG. 2). Upon initiation, process 4000 may fetch 4010 the next packet in its queue. The header of the packet can be parsed 4012 in order to determine whether the packet is a DNS packet, which can indicate starting of a new session. If 4014 the packet is not a DNS, then the AST 230 can be searched 4015 for an entry that is associated with the relevant session (source and destination IP addresses and ports). Based on the routing information, written in that entry, the packet can be transferred toward the relevant ABSH 240 (FIG. 2) or directly toward its destination.

If 4014 the packet is a DNS, then the packet can be parsed 4016 in order to determine the domain name of the destination of that packet. Based on the domain name the DDB 142 (FIG. 1) can be searched looking 4020 for a record that is associated with the domain/server name. If 4020 a record exists, indicating that the domain (the server) can be referred as a suspected domain that can deliver encrypted compressed media. Then, at block 4024 a new ABSH 240 (FIG. 2) can be allocated in order to handle the traffic of the new session. In addition an entry in the AST 230 can be allocated 4024 for that session pointing on the allocated ABSH 240 as the next hop for the following packets of that session. Then, the current received packet can be transferred 4024 toward its destination via the allocated ABSH 240.

If 4020 a record does not exist in DDB 142, indicating that the domain (the server) is not a suspected domain. Then, at block 4022 a new entry in the AST 230 can be allocated for that session informing the proxy to transfer the next packets of that session and the current received packet directly toward its destination and process 4000 can return to block 4010 for handling the next packet in the queue. Those skilled in the art will appreciate that other SPP can handle other protocols in a similar way to the disclosed above in relation to HTTPS and HTTP.

Figure 5:
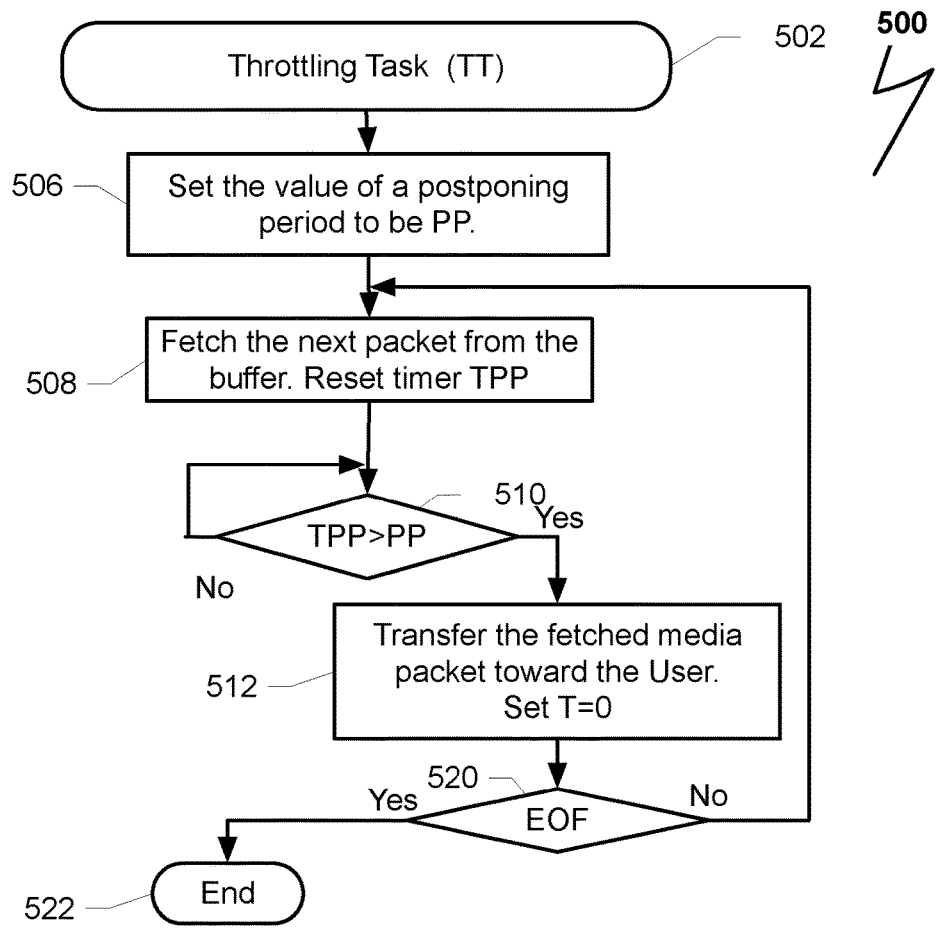
FIG. 5 illustrates a flowchart with relevant actions of a process that can be implemented by an example of a Throttling Task (TT)).

Referring now to FIG. 5 that illustrates a flowchart with relevant actions of an example of throttling process 500. The process can be implemented by an example CTM 246 (FIG. 2). In some embodiments, process 500 can be initiated 502 when a new compressed media session is detected. In some embodiments, the initiation can be implemented by MM 220, in other embodiments the SPP 210A-C (FIG. 2) can initiate the process. Upon initiation process 500 can set 506 a timer for measuring the postponing period (PP). The value of the timer can be in the range between 0-3000 milliseconds, for example. Some embodiments of process 500 may use the value of 20 milliseconds as an example of PP.

After setting 506 the value of the postponing period (PP), a next packet can be fetched 508 from the CTM queue, and the timer TPP can be reset. Then, process 500 can wait 510 until the value of TPP is larger than the value of PP. When the value of TPP becomes larger than the value of PP, then the fetched packet can be transferred 512 toward its destination and the timer TPP can be reset. Next, at block 520 a decision can be made whether the end-of-file indication (EOF) is reached. If the EOF was reached, then the MM 220 can be informed to release the allocated resources and process 500 can be terminated 522. The released resources can comprise the CTM 246 and the relevant connection buffer 248 (FIG. 2). In other embodiment (not shown in the figures), a decision can be made whether the streaming session is terminated by checking the period of time that no data is sent over the relevant session channels.

If 520 the EOF was not reached, then process 500 can return to block 508 for handling the next packet in the queue. In some embodiments the postponed packets can be packets that are sent from the relevant server toward the relevant SE 110. In other embodiments, the postponed packets can be ACK packets that are sent from a SE 110 toward a relevant server.

Some embodiment of process 500 can be configured to detect responses to seek request. After detecting a seek section an embodiment of process 500 can be configured to pause the throttling to a small period of time to enable buffer filling on the client side without adding stall. Some embodiments of process 500 can identify a seek request by analyzing the upload packets size, and/or packet frequency or other parameters. An increase in the volume of downloaded data, increase in number of transmitted packets or size, can reflect a response to a seek request.

The above description is intended to be illustrative, and not restrictive. For example, the above-described embodiments may be used in combination with each other. Many other embodiments will be apparent to those of skill in the art upon reviewing the above description.

The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein".

The invention claimed is:

1. A method comprising:
   (a) employing a multi-level-adaptive-bitrate-intermediate server (MLABIS) that is communicatively coupled between a plurality of surfer-equipment (SEs) and a plurality of domains,
   (b) employing a domain database (DDB) wherein each entry in the DDB is associated with a domain having one or more servers and comprises information related to the ability of the domain to deliver encrypted multi-level-adaptive-bitrate (MLABR) streaming;
   wherein the MLABIS is configured to:
   (1) intercept the data communications traveling between the plurality of SEs and the plurality of domains;
   (2) identify a new session between an SE and a domain;
   (3) identify the new session as a suspected encrypted multi-level-adaptive-bitrate streaming session that carries encrypted compressed media;
   (4) throttle one or more connections associated with the suspected encrypted multi-level adaptive-bitrate streaming session;
   (5) confirming the new session as an encrypted multi-level-adaptive-bitrate streaming session if the SE switches to a lower bitrate stream in response to the throttling; and
   (6) responsive to confirming the new session as an encrypted-multi-level adaptive-bitrate streaming session, updating the information in the DDB to indicate that the domain of the new session in the DDB is capable of delivering encrypted MLABR media.

2. The method of claim 1, wherein the MLABIS is configured to identify that the new session is a suspected encrypted multi-level-adaptive-bitrate streaming session is implemented by searching the DDB looking for an entry that is associated with that domain.

3. The method of claim 1, wherein the MLABIS is configured to confirm that the new session is an encrypted multi-level-adaptive-bitrate streaming session is implemented by throttling one or more connections or protocols that carry the data traffic of the session in an increased pattern until the transmitted bitrate is reduced in a step to a lower bitrate.

4. The method of claim 1, wherein the MLABIS is configured to throttle the one or more connections or protocols is implemented by postponing obtained packets of the new multi-level-adaptive-bitrate session that are sent from the domain toward the SE over the one or more connections.

5. The method of claim 1, wherein the MLABIS is configured to throttle the one or more connections is implemented by postponing obtained packets of the new multi-level-adaptive-bitrate session that are sent from the SE toward the domain over the one or more connections.

6. The method of claim 1, wherein the MLABIS is further configured to:
   a. identify a period of responding to a seek request;
   b. decrease, during the identified period, the throttling over the one or more connections for accelerating the response to the seek request; and
   c. resume, at the end of the identified period, the throttling over the one or more connections.

7. The method of claim 6, wherein the MLABIS is further configured to identify a period of responding to a seek request is implemented by analyzing the size of packets that are sent from the SE toward the domain.

8. The method of claim 6, wherein the MLABIS is further configured to identify a period of responding to a seek request is implemented by identifying an increase in the frequency of downloaded packets.

9. A multi-level-adaptive-bitrate-intermediate server (MLABIS) comprising:
   a processor;
   a memory; and
   an active-session table (AST) stored in the memory device, wherein the AST comprises a plurality of entries with each entry being associated with a download session carrying encrypted compressed media and each entry containing information related to a surfer-equipment (SE) that participates in the download session, and information related to the download session;
   one or more adaptive-bitrate-session-handlers (ABSH) implemented by the processor, each ABSH is associated with a download session and is configured to throttle one or more connections that are associated with the download session, which carries encrypted compressed media, leading the SE that is associated with the download session to switch to a lower bitrate;
   wherein the MLABIS is communicatively coupled between a plurality of SEs and a plurality of domains; and
   wherein the MLABIS is configured to:
   (1) intercept the data communications traveling between the plurality of SEs and the plurality of domains;
   (2) identify a new session between an SE and a domain;
   (3) identify the new session as a suspected encrypted multi-level-adaptive-bitrate streaming session that carries encrypted compressed media;
   (4) throttle one or more connections associated with the suspected encrypted multi-level adaptive-bitrate streaming session;
   (5) confirm the new session as an encrypted multi-level-adaptive-bitrate streaming session if the SE switches to a lower bitrate stream in response to the throttling; and
   (6) responsive to confirming the new session as an encrypted-multi-level adaptive-bitrate streaming session, updating information in a domain database (DDB) to indicate that the domain of the new session in the DDB is capable of delivering encrypted MLABR media.

10. The MLABIS of claim 9, wherein the SE containing a device selected from the group consisting of: a laptop, a mobile phone, a personal-digital-assistance (PDA), a computer, a smart phone, and a tablet computer.

11. The MLABIS of claim 9, wherein the information related to the download session containing information related to a parameter selected from the group consisting of: protocol type, source Internet Protocol (IP) address, source IP port number, destination IP address, destination IP port number, domain name, and session ID.

12. The MLABIS of claim 9, wherein the ABSH is configured to throttle one or more connections by postponing obtained packets of the download session that are sent toward the SE over the one or more connections.

13. The MLABIS of claim 9, wherein the ABSH is configured to throttle the one or more connections is implemented by postponing acknowledge packets sent from the SE.

14. The MLABIS of claim 9, wherein the ABSH comprising:
   a. one or more connection throttling module (CTM), each CTM is associated with a connection that carries packets related to the download session; and
   b. one or more connection-buffers, each connection buffer is utilized to store postponed packets that are carried over that connection.

15. The MLABIS of claim 14, wherein the one or more connection-buffers is implemented by a computer readable medium selected from the group consisting of: read/write hard disc, Flash memory, random-access memory (RAM).

16. The MLABIS of claim 9, further comprising a manager module that is configured to identify the establishment of a new session between a SE and a domain.

17. The MLABIS of claim 16, wherein the manager module is configured to identify the establishment of a new session is implemented by searching the AST for an entry that is associated with the new session.

18. The MLABIS of claim 16, wherein the manager module is further configured to determine whether the new session is a suspected multi-level-adaptive-bitrate streaming session or not a suspected multi-level-adaptive-bitrate streaming session.

* * * * *